United States Patent Office 3,180,856
Patented Apr. 27, 1965

3,180,856
HALOGENATION OF OLEFIN POLYMERS
Frank J. Szalla and Richard E. Dietz, Bartlesville, Okla., assignors to Phillips Petroleum Company, a corporation of Delaware
No Drawing. Filed Dec. 8, 1960, Ser. No. 74,481
14 Claims. (Cl. 260—79.3)

This invention relates to a method of incorporating either chlorine or bromine into normally solid polymers of aliphatic 1-olefins.

The halogenation of olefin polymers, such as the chlorination or chlorosulfonation of polyethylene, is useful to produce rubbery to resinous products having a wide variety of physical properties. There are a number of different processes for halogenation of olefin polymers. One of the most favored methods involves contacting the polymer with a halogenating agent while maintaining the finely divided polymer in suspension in an aqueous medium. Elemental chlorine or bromine are used and the reactions are carried out in the presence of a catalyst, such as actinic light. A convenient procedure is to disperse finely divided polymer in an inert liquid such as water and keeps the system in an agitated state while passing in elemental chlorine. With an elevated temperature and in the presence of a suitable catalyst, chlorination of the polymer to high levels is effected.

We have now discovered that in chlorinating or brominating polymers of aliphatic 1-olefins in dispersion in an inert medium, certain properties of the halogenated polymer can be enhanced by a pretreatment step in which polymer in a finely divided form is mixed with a liquid halogenated hydrocarbon until thoroughly wetted and thereafter the polymer is dispersed in the inert medium for halogenation. In the practice of this invention the halogens can be either chlorine or bromine and it is preferred that the halogenated hydrocarbon likewise be one which contains either chlorine or bromine, preferably the same halogen which is used to contact the polymer in the process. We have further discovered that products of substantially improved tensile strength can be obtained by carrying out at least a portion of the halogenation process at a temperature above the crystalline freezing point of the olefin polymer.

It is an object of our invention to provide a method of incorporating a halogen into a normally solid polymer of an aliphatic 1-olefin. Another object of our invention is to provide a method of obtaining chlorinated ethylene polymers of substantially improved tensile strength. Still another object of the invention is to improve the chlorosulfonation of polyethylene.

Other objects, advantages and features of our invention will be apparent to those skilled in the art from the following discussion.

The polymers which are treated according to the process of the invention are normally solid polymers of aliphatic 1-olefins, preferably those having 2 to 8 carbon atoms per molecule and no branching nearer the double bond than the 4-position. Examples of such polymers are polyethylene, polypropylene and similar polymers of mono-1-olefins such as 1-butene, 1-pentene, 4-methyl-1-pentene, 1-octene and the like. Especially suitable are the ethylene polymers which include polyethylene and copolymers of ethylene with minor amounts of 1 or more of the higher molecular weight mono-1-olefins mentioned above, particularly propylene and 1-butene. Among the preferred ethylene polymers are those which have relatively high density, for example, a density in the range of 0.930 to 1.00 gram per cubic centimeter at 25° C. The polypropylene employed will normally have a density of about 0.850 to 0.940 gram per cubic centimeter at 25° C.

In density determinations the specimens are prepared by compression molding the polymer at 340° F. until completely molten followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature. This polymer sample is then at equilibrium and its density can be determined by any conventional method. One suitable method is to place a smooth void-free pea-size specimen cut from the compression molded slab in a 50 millimeter glass stoppered graduate. Carbon tetrachloride and methylcyclohexane are added to the graduate in proportion such that the specimen is suspended in solution. When the mixture just suspends the specimen a portion of the liquid is transferred to a small test tube and placed on the platform of a Westphal balance and a glass bob lowered therein. With the temperature shown by the thermometer in the bob in the range of 73–78° F. the balance is adjusted until the pointer is at 0. The balance shown on the scale is taken as the specific gravity. With the balance standardized to read 1.000 with a sample of distilled water at 4° C. the specific gravity is numerically equal to density in grams per cubic centimeter.

The olefin polymers which are halogenated by this process can be prepared by a number of well known processes, preferably the low pressure polymerization processes such as that described in the patent to Hogan et al., 2,825,721. Also processes employing a catalyst of the organometal type are suitable.

The normally solid olefin polymer is used in a subdivided state, ordinarily having a particle size in the range of about 10 to about 100 mesh (U.S. Standard sieve). This finely divided polymer form is mixed with a liquid halogenated hydrocarbon such as carbon tetrachloride, carbon tetrabromide, perchloroethylene, tetrachloroethane, pentachloroethane, chloroform, dichloroethane, o-dichlorobenzene, bromoform, or the like. These halogenated hydrocarbons can be employed alone or admixture with each other. Carbon tetrachloride is preferred. The finely divided polymer is mixed with the halogenated hydrocarbon in sufficient amount to thoroughly wet the polymer. The amount of halogenated hydrocarbon required to wet the polymer will vary depending upon such circumstances as the particle size of the polymer. In general the amount used is about 1 to 3 parts by weight of halogenated hydrocarbon per part of olefin polymer. Ordinarily not enough of the halogenated hydrocarbon is employed to form a separate liquid phase but any excess liquid can be drained off prior to dispersing the polymer in the inert medium for halogenation. A mixing device such as a tumbling drum can be used to contact the polymer and liquid. The polymer is then dispersed in an inert medium, such as water, and the dispersion is maintained by agitation.

After the polymer has been dispersed in water or other inert medium the temperature is elevated to the desired level for the reaction. If the catalyst used for the halogenation is actinic light the chlorine or bromine can be charged initially and the light turned on after the heating is started. If another catalyst, such as an organic peroxidic material is used, it is frequently convenient to charge the catalyst initially and introduce the chlorine or bromine while raising the temperature to operating level. The time for the reaction will be governed by the temperature level employed, the degree of chlorination desired, the type of catalyst used or intensity of illumination when actinic light is used as the catalyst. Ordinarily the time for the halogenation is in the range of about 5 minutes to 5 hours.

The amount of halogen charged depends upon the desired amount of the halogen in the final polymer. In chlorination, for example, the final polymer contains about 10 to 80 weight percent chlorine and preferably 20 to 60 weight percent chlorine. Approximately one-half of all the chlorine charged enters the polymer while the other half forms HCl. The actual chlorine content of the polymer normally is slightly less than the theoretical maximum under these conditions. At the end of the reaction period, which can readily be determined by noting the disappearance of free chlorine or bromine in the system, the polymer is recovered, washed and dried. If it is desired to chlorosulfonate the polymer the procedure is modified by charging to the slurry a sulfonating agent such as sulfur dioxide, chlorosulfonic acid or sulfuryl chloride. The preferred chlorosulfonating agents are chlorine and sulfur dioxide.

The halogenation is carried out at temperatures below 400° F., preferably in the range of about 100 to 300° F. We have discovered that the results of our process are especially advantageous if at least a portion of the halogenation is carried out at a temperature above the crystalline freezing point of the polymer being treated. Crystalline freeze point determinations are carried out by melting a sample of the polymer, inserting a thermocouple into the molten polymer, and allowing the molten polymer to cool slowly. The temperature is recorded and is plotted on a chart versus time. The crystalline freeze point is the first plateau in the time versus temperature curve. For example, the crystalline freezing point of polyethylene having a density of about 0.960 gram per cubic centimeter is about 252° F. The crystalline freezing point of ethylene/1-butene copolymers in the preferred density range is between about 238 and 245° F., while the crystalline freezing point of polypropylene is about 250° F. Ordinarily, therefore, if the temperature of the halogenation is carried out, at least in part, above 250° F. the improved results of the preferred aspect of our invention can be obtained.

When operating at a temperature below the crystalline freezing point of the polymer the elongation of the product polymer is increased and the flex temperature is lowered as compared with polymers chlorinated in the absence of the prewetting step of this invention. By raising the temperature so that at least a portion of the chlorination, preferably at least 10 percent of the chlorination, is carried out at a temperature above the crystalline freezing point of the polymer, the advantages observed in operating in the lower range are still observed together with a very significant increase in tensile strength. Ordinarily whenever the higher chlorination temperatures are used the reactants are in contact during the time that the temperature is being raised to the operating level so that at least some of the chlorination occurs at temperatures both above and below the crystalline freezing point of the polymer. As pointed out above, however, according to the preferred aspect of our invention for the preparation of polymers having a combination high tensile strength, high elongation and low flex temperature it is only necessary that a portion of the chlorination be carried out at temperatures above the crystalline freezing point of the polymer.

When operating at temperatures above the crystalline freezing point of the polymer, that is, at temperatures above about 250° F., it is desirable that measures be taken to prevent agglomeration of the polymer. In order to avoid this the use of a finely divided dispersant is advisable. Suitable compounds are talc, silicon dioxide, titanium dioxide and the like. The amount of dispersant used is generally in the range between about 10 and 50 parts by weight to 100 parts of the polymer. One highly effective method of stabilizing the dispersions of polymer in the inert medium while chlorinating at elevated temperatures is through the use of a combination of high molecular weight quaternary ammonium halide and a finely divided siliceous mineral, for example, about 0.05 to 20 parts by weight of cetyl dimethylethylammonium bromide and about 1 to 50 parts by weight of silica having a screen mesh particle size of 50 or less.

While effective dispersion of the finely divided polymer in the inert medium can be effected by vigorous agitation of the system, the addition of a small amount of wetting agent to stabilize the dispersion is frequently of advantage. Suitable materials for this purpose include organic sulfates, sulfonates, polyphosphates, aralkyl polyethers and the like. A suitable amount of such a wetting agent is in the range of about 0.5 to 5 parts per 100 parts by weight of polymer.

The amount of inert liquid used as a dispersing medium is normally about 5 to 15 gallons per kilogram of polymer. It is preferred that this medium be water although any nonsolvent inert to the polymer and halogenating agent could be used. Since the halogenation is frequently conducted at temperatures above the boiling point of water it is necessary in some instances that the operation be conducted under elevated pressure sufficient to maintain the system in the liquid phase. Pressures as high as 100 p.s.i.g. are normally sufficient for this purpose, although higher pressures can be used. The pressure in the system can be maintained by charging gaseous chlorine and normally no other pressure regulation is necessary.

In order to further illustrate our invention the following examples are presented. The specific conditions and proportions in these examples are presented as being typical only and should not be construed to limit our invention unduly.

EXAMPLE I

A series of runs was made in which a high density polyethylene (0.960 gram per cc.) was chlorinated to various levels. In this series six runs were made using the wetting procedure of the invention and six runs as nearly identical as possible but without the wetting step. In these runs the polyethylene was ground in a Wiley mill to pass a 0.03 inch screen. Two pounds of this ground polymer were used for each run. For the runs of the invention, the powdered polymer was wet by thorough mixing with three pounds of carbon tetrachloride prior to charging. For all runs, the polymer, wet or dry as the case might be, was placed in a jar with five gallons of water, 300 grams of titanium dioxide, and five grams of lauryl sulfate and mixed thoroughly with a high speed stirrer. This mixture was then drawn into a 20 gallon Pfaudler reactor to which had previously been charged four gallons of water. After the charge was in the reactor, one gallon of water was passed in to rinse the lines. A 100 watt ultraviolet light was fitted to a Pyrex glass window in the top of the reactor and all valves closed. To the system was then charged the desired amount of chlorine after which the reactor was heated by passing steam through the jacket. The light was turned on as the temperature rose and shut off at the end of the reaction period. Since chlorine was charged under pressure, the system was maintained under pressure during the reaction period. The initial pressures ranged from about 2 to 6 atmospheres gauge. Course of the reaction could be followed by observing disappearance of chlorine in the system. When the reaction was complete, the pressure was vented and the reaction mixture passed into a ceramic filter. The polymer was washed with water, then with methanol and dried under vacuum. Portions of polymer were analyzed for chlorine content and evaluated.

Operating and evaluation data are shown in Table I.

Table I

| Run No. | CCl₄ on Polymer (lb.) | Temp. (° F.) | Chlorine, lb. chg. | Chlorine, percent [1] | Tensile (p.s.i.) [2] | Elongation, percent [2] | Flex Temp. (° F.) [2] |
|---|---|---|---|---|---|---|---|
| 1 | 3 | 260 | [3] 4.0 | 47 | 2,000 | 240 | −6 |
| 2 | None | 260 | [3] 4.0 | 44 | 1,663 | 150 | −4 |
| 3 | 3 | 260 | 2.7 | 38.6 | 1,190 | 710 | −20 |
| 4 | None | 260 | 2.7 | 37.2 | 860 | 250 | −10 |
| 5 | 3 | 260 | 1.8 | 30.4 | 1,390 | 1,500 | −19 |
| 6 | None | 260 | 1.8 | 29.8 | 830 | 190 | −20 |
| 7 | 3 | 220 | 4.0 | 47.4 | 1,380 | 230 | 2 |
| 8 | None | 220 | 4.0 | 44.5 | 1,900 | 10 | 50 |
| 9 | 3 | 220 | 2.7 | 40.1 | 1,100 | 710 | −10 |
| 10 | None | 220 | 2.7 | 34.5 | 2,040 | 10 | 10 |
| 11 | 3 | 220 | 1.8 | 32.6 | 1,300 | 940 | −19 |
| 12 | None | 220 | 1.8 | 28.2 | 2,970 | 10 | 34 |

[1] Analysis of chlorine was effected by burning the chlorinated sample in a quartz tube and analyzing for chlorides by the method of Volhard (silver nitrate titration).
[2] Tensile strength and elongation values were obtained according to ASTM D–638–52T using a cross-head speed of 20 inches per minute. Flex temperature was obtained by ASTM D–1043.
[3] 3 lb. chg. initially, 1 lb. when up to temperature.

As shown by the above data, prewetting the polymer with carbon tetrachloride prior to contacting the polymer in an aqueous dispersion with chlorine results in polymers which have substantially improved elongation and lower flex temperature. The data also show that when carrying out at least a portion of the chlorination at a temperature of 260° the tensile strength of the polymers is improved. The crystalline freezing point of the polyethylene used was about 252° F. The tensile strengths obtained at the 220° chlorination temperature without prewetting the polymer are obtained at the sacrifice of elongation and flex temperature. As illustrated in this example the chlorine was charged at the beginning of the process prior to heating the slurry to reaction temperature. At least some of the chlorination occurred while the slurry was reaching chlorination temperature. The length of time required to reach the maximum temperature and the time held at maximum temperature varied in each case but as shown by the data the improvements in tensile strength, elongation, flex temperature were obtained only when at least a portion of the reaction was carried out at the higher temperature.

EXAMPLE II

In these runs, the procedure followed was essentially the same as that described in Example I. The polymer was wetted with an equal weight of carbon tetrachloride and dispersed in water containing a small amount of cetyl pyridinium bromide and 100 grams of finely divided silica. Instead of using ultraviolet light as a catalyst, lauroyl peroxide was employed. In each run the amount of water used as the dispersing medium was 37 pounds. Data on these runs are set forth in the following tabulation, controls being presented in which the polymer was not pretreated.

Table II

|  | 1 | 2 | 3 | 4 |
|---|---|---|---|---|
| Polyethylene, gms | 500 | 500 | 500 | 500 |
| Carbon Tetrachloride, gms | 500 |  | 500 |  |
| Chlorine, lb | 1.5 | 1.5 | 1.5 | 1.5 |
| Sulfur Dioxide, gms | 65 | 60 | 60 | 60 |
| Cetyl Pyridinium Bromide, gms | 5 | 5 | 5 | 5 |
| Silica, gms | 100 | 100 | 100 | 100 |
| Lauroyl Peroxide, gms | 2 | 2 | 2 | 2 |
| Hcl, ml.[1] | 300 | 300 | 300 | 300 |
| Temp., ° F | 178–184 | 178–184 | 184–228 | 180–226 |
| Time, Min | 40 | 45 | 60 | 64 |
| Chlorine Content (calc.), percent | 40 | 40 | 40 | 40 |
| Sulfur Content, percent | 0.09 | 0.03 | 0.12 | 0.03 |

[1] Added to protect glass lining of reactor against etching by reaction components.

The above data indicate that substantial improvement in chlorosulfonation is obtained when prewetting the polymer with carbon tetrachloride prior to dispersing and contacting it with sulfur dioxide and chlorine. It is noted that at the higher temperature levels the sulfur content of the polymers which were treated according to the invention increased while there was essentially no change in sulfur content of the polymers which were not wetted with the carbon tetrachloride prior to chlorosulfonation.

As will be apparent to those skilled in the art from the above disclosure various modifications can be made in our invention without departing from the spirit or scope thereof.

We claim:

1. In a method of halogenating a normally solid polymer of an aliphatic 1-olefin having from 2 to 8 carbon atoms per molecule and no branching nearer the double bond than the 4-position by reaction with a halogen selected from the group consisting of chlorine and bromine, said polymer being suspended in water, the improvement which comprises wetting said polymer with a normally liquid halogenated hydrocarbon selected from the group consisting of carbon tetrachloride, carbon tetrabromide, perchloroethylene, tetrachloroethane, pentachloroethane, chloroform, dichloroethane, o-dichlorobenzene, and bromoform and subsequently effecting said halogenation substantially in the absence of a separate liquid phase of said halogenated hydrocarbon.

2. The method of claim 1 wherein a sulfonating agent selected from the group consisting of sulfur dioxide, chlorosulfonic acid, and sulfuryl chloride is added to said dispersion in addition to said halogen.

3. The method of claim 2 wherein said halogen is chlorine and said sulfonating agent is sulfur dioxide.

4. In a method of chlorinating a normally solid polymer of an aliphatic mono-1-olefin having from 2 to 8 carbon atoms per molecule and no branching nearer the double bond than the 4-position by contacting elemental chlorine with an aqueous suspension of said polymer in comminuted form, the improvement which comprises wetting said polymer with carbon tetrachloride and subsequently effecting said chlorination at a temperature in the range 100 to 300° F. substantially in the absence of a separate liquid carbon tetrachloride phase.

5. The method of claim 4 wherein said polymer is polypropylene.

6. The method of claim 4 wherein said polymer is an ethylene polymer having a density of at least 0.930 gram per cubic centimeter at 25° C.

7. The method of claim 4 wherein the chlorination is carried out at least in part at a temperature above the crystalline freeze point of the polymer.

8. A method of chlorinating polyethylene which comprises mixing 1 part by weight of finely divided polyethylene with about 1 to 3 parts by weight of normally liquid chlorinated hydrocarbon selected from the group consisting of carbon tetrachloride, carbon tetrabromide, perchloroethylene, tetrachloroethane, o-dichlorobenzene and bromoform thereby wetting said polyethylene with said chlorinated hydrocarbon, draining any excess liquid solvent from said polyethylene, thereafter dispersing said wet polyethylene in about 5 to 15 gallons of water per kilogram of polyethylene, and contacting said polymer thus dispersed with sufficient chlorine to provide about 10 to 80 weight percent of chlorine in the final product at a temperature in the range of about 100 to 300° F.

9. The method of claim 8 wherein said chlorinated hydrocarbon is carbon tetrachloride.

10. The method of claim 8 wherein said chlorination is carried out entirely at temperatures below about 250° F.

11. The method of claim 8 wherein at least a portion of said chlorination is carried out above 250° F.

12. A method of chlorinating ethylene polymer having a density of at least 0.930 gram per cubic centimeter at 25° C. which comprises mixing 1 part by weight of said polymer in finely divided form with about 1 to 3 parts by weight of carbon tetrachloride thereby thoroughly wetting said polymer, draining any excess carbon tetrachloride from said polymer, thereafter dispersing said wet polymer in 5 to 15 gallons of water per kilogram of polymer in admixture with a finely divided dispersant selected from the group consisting of talc, silicon dioxide, titanium dioxide, silica associated with cetyl pyridinium bromide, and silica associated with cetyl dimethylethyl ammonium bromide and a wetting agent selected from the group consisting of organic sulfates, sulfonates, polyphosphates and aralkyl polyethers, and contacting said polymer with chlorine in an amount sufficient to provide a product containing 20 to 60 weight percent chlorine, at least a portion of said contacting being carried out above 250° F.

13. The method of claim 12 wherein said ethylene polymer is a copolymer of ethylene and 1-butene.

14. The method of claim 12 wherein said ethylene polymer is polyethylene.

References Cited by the Examiner
UNITED STATES PATENTS

| | | | |
|---|---|---|---|
| 2,183,556 | 12/39 | Fawcett | 260—94.97 |
| 2,972,604 | 2/61 | Reynolds et al. | 260—79.3 |
| 3,035,038 | 5/62 | Nolte et al. | 260—96 |
| 3,071,569 | 1/63 | Hoerger | 260—94.9 |

FOREIGN PATENTS 1,061,074  7/59  Germany.

WILLIAM H. SHORT, *Primary Examiner.*

H. N. BURSTEIN, J. R. LIBERMAN, *Examiners.*